(12) United States Patent
Wallace (10) Patent No.: US 8,763,789 B2
(45) Date of Patent: Jul. 1, 2014

(54) DRIVE SYSTEM FOR CURVED ROLLER CONVEYOR SEGMENTS

(71) Applicant: Matthew Earl Wallace, West Olive, MI (US)

(72) Inventor: Matthew Earl Wallace, West Olive, MI (US)

(73) Assignee: TGW Systems, Inc., Spring Lake, MI (US)

( * ) Notice: Subject to any disclaimer, the term of this patent is extended or adjusted under 35 U.S.C. 154(b) by 0 days.

(21) Appl. No.: 13/789,890

(22) Filed: Mar. 8, 2013

(65) Prior Publication Data

US 2013/0233678 A1 Sep. 12, 2013

Related U.S. Application Data

(60) Provisional application No. 61/608,154, filed on Mar. 8, 2012.

(51) Int. Cl.
*B65G 13/08* (2006.01)

(52) U.S. Cl.
USPC .......................................... 198/787; 198/831

(58) Field of Classification Search
USPC .......................................... 198/831, 787, 790
See application file for complete search history.

(56) References Cited

U.S. PATENT DOCUMENTS

| | | | |
|---|---|---|---|
| 2,729,324 A | 1/1956 | Howdle | |
| 2,758,731 A | 8/1956 | Davis | |
| 3,085,696 A | 4/1963 | Stainforth | |
| 3,667,589 A | 6/1972 | Constable | |
| 3,690,443 A * | 9/1972 | Snyder | 198/831 |
| 3,729,088 A | 4/1973 | Stein et al. | |
| 3,810,538 A | 5/1974 | Moyes | |
| 3,951,256 A * | 4/1976 | Gurewitz | 198/831 |
| 4,096,942 A | 6/1978 | Shepherd | |
| 4,103,769 A | 8/1978 | Jorgensen | |
| 4,108,303 A | 8/1978 | Vogt et al. | |
| 4,143,755 A | 3/1979 | Keller | |
| 4,148,391 A | 4/1979 | Stobb | |
| 4,193,492 A | 3/1980 | Hammond | |
| 4,223,780 A | 9/1980 | Saur | |
| 4,273,239 A | 6/1981 | Thwaites et al. | |
| 4,353,458 A | 10/1982 | Saur | |
| 4,361,224 A | 11/1982 | Bowman | |
| 4,413,724 A | 11/1983 | Fellner | |
| 4,444,209 A | 4/1984 | Seragnoli | |
| 4,453,627 A | 6/1984 | Wilkins | |
| 4,485,913 A | 12/1984 | Treiber | |
| 4,570,780 A | 2/1986 | Thwaites et al. | |
| 4,721,203 A | 1/1988 | Kimball et al. | |
| 4,752,000 A | 6/1988 | Hodgin | |
| 4,768,646 A | 9/1988 | Devins | |
| 4,835,947 A | 6/1989 | Langen et al. | |
| 4,854,445 A | 8/1989 | Eaton et al. | |
| 5,007,526 A | 4/1991 | Fazzina et al. | |
| 5,083,655 A | 1/1992 | Becker | |
| 5,558,205 A | 9/1996 | Helgerson et al. | |
| 5,826,702 A | 10/1998 | Gibson et al. | |
| 5,899,659 A | 5/1999 | Beilsmith | |
| 5,988,362 A | 11/1999 | Nakamura et al. | |
| 6,062,379 A | 5/2000 | Geib et al. | |
| 6,162,157 A | 12/2000 | Morisod | |
| 6,223,888 B1 | 5/2001 | Jahns | |

(Continued)

*Primary Examiner* — James R Bidwell
(74) *Attorney, Agent, or Firm* — Dickinson Wright PLLC (57) ABSTRACT

A drive system for curved segments of roller conveyors and more specifically to a cost-effective, efficient, and reliable system of transferring power from a straight segment to an adjacent segment.

19 Claims, 6 Drawing Sheets

(56) References Cited

U.S. PATENT DOCUMENTS

| | | |
|---|---|---|
| 6,390,286 B1 | 5/2002 | Nguyen et al. |
| 6,565,689 B2 | 5/2003 | Geib et al. |
| 6,814,222 B2 | 11/2004 | Henson et al. |
| 7,398,874 B2 | 7/2008 | Deur |
| 7,540,375 B2 | 6/2009 | Freudelsperger |
| 7,604,110 B2 | 10/2009 | Deur |
| 2005/0167248 A1* | 8/2005 | Lockwood .................. 198/787 |
| 2005/0263376 A1* | 12/2005 | Cotter et al. .................. 198/831 |
| 2008/0190742 A1* | 8/2008 | Zmaj .................. 198/831 |
| 2011/0011039 A1 | 1/2011 | Doyle et al. |

* cited by examiner

DRIVE SYSTEM FOR CURVED ROLLER CONVEYOR SEGMENTS

CROSS REFERENCE TO RELATED APPLICATIONS

This U.S. Utility patent application claims the benefit of U.S. Provisional Application Ser. No. 61/608,154 filed Mar. 8, 2012, the entire disclosure of the application being considered part of the disclosure of this application and hereby incorporated by reference.

BACKGROUND OF THE INVENTION

1. Technical Field

The present invention relates to a drive system for curved segments of roller conveyors, and more specifically to cost-effective, efficient, and reliable systems of transferring power from a straight segment to an adjacent curved segment of an accumulator conveyor system.

2. Related Art

Roller conveyors are commonly found in a variety of a manufacturing, distribution, and warehouse facilities. Most roller conveyor systems include a variety of straight and curved segments configured to allow products, individually or packaged together, to wind their way through a facility past various operations and to various destinations. An exemplary roller conveyor is an accumulation conveyor configured to allow live storage of products or loads on the conveyor system. Accumulator conveyors are configured to start and stop various segments or portions of segments as needed, to allow the packages or loads to accumulate or be conveyed along to a destination.

Most roller conveyor systems typically include a supporting structure having frames that extend along the path of travel and a plurality of rollers extending between the frames, at right angles to the direction of travel. A drive system transfers power to the individual rollers on which the loads rest. The drive system causes the rollers to spin and the load is conveyed to its desired destination.

The curved segments of roller conveyors and in particular, the drive system for curved segments is traditionally more complex, difficult, and expensive than drive systems for similar straight segments. A drive system for any segment, whether straight or curved, must allow smooth transitions between being engaged and disengaged, allow loads to travel smoothly, and provide efficient, reliable, low maintenance, and effective transfer of power to the individual rollers whether in transportation mode or accumulation. In the curved segments, it is particularly difficult to have the rollers in the curved segment to accumulate in sequence with the straight conveyor it is feeding because the drive system for the curved conveyor segment is required to be of a different or additional drive system than the adjacent straight conveyor segment. The drive system for curved segments in prior art systems employ complex electronic clutches, sophisticated pneumatic circuits or expensive motorized roller solutions that drop the drive off the curved segment in sequence with the adjacent straight conveyor.

In contradistinction to curved segments, many manufactures of roller conveyors have developed cost-effective, efficient, and reliable drive systems for straight segment roller conveyors. More specifically, most manufacturers now use an elongated, substantially flat, wide belt running the entire length of the straight segment to drive the rollers. This elongated drive belt is located on the opposing sides of the rollers from the load surface and is substantially wider than V-belts. As the belt is not as wide as the rollers, it is typically positioned on one side of the straight conveyor segment, although it may be positioned anywhere between the frames so long as it is capable of engaging the rollers. If used in an accumulation conveyor system, the drive system may be split into various segments such that it is configured to engage or disengage at various zones depending if it is desirable for the loads to be stationary or moving in those zones. Therefore, a single, straight conveyor segment may have multiple zones where loads may be selectively transported or accumulated as desired.

The use of a flat, elongated, and wide belt has specific advantages if a roller stops turning, such as when loads jam and cause the rollers to stop spinning. If the roller stops rotating, the frictional load and associated heat load of the belt slipping against the roller(s) is spread over a large section of the belt, thereby minimizing wear on the drive belt. This type of drive system using an elongated wide belt is a substantial improvement over prior systems that used complicated drive shafts, power rollers or V-belts, which typically powered only selected rollers, such that drive from the selected rollers must be transferred to the adjacent rollers using inefficient O-rings that are set within the surface of the individual rollers. One major issue with using O-rings to power adjacent rollers is that they are not an efficient transfer of power, and typically only two to three and at most, four to six adjacent rollers may be powered before the system is incapable of efficiently transferring the loads. In addition, V-belts and O-rings quickly wear out due to the frictional load, especially if a roller stops rotating for any reason. Therefore, manufacturers have avoided any roller to roller power transfer, other than for one to two adjacent rollers.

While cost-effective, long lasting, reliable, and efficient drive systems have been developed for straight segments of roller conveyers, there is still room for improvement of drive systems used in curved segments of conveyor systems, in particular when they are used in conjunction with an accumulation conveyor. Due to the radius of the curved section, it is impracticable if not impossible to use on curved segments the above described elongated, wide, and flat belt that is used on straight segments. As illustrated in FIGS. 1-4, a variety of expensive and less efficient drive systems have been proposed to provide drive to the individual rollers on a curved roller conveyor segment. When the curved roller conveyor segment is used in an accumulation conveyor, where it is desirable to start and stop the curved segments independent of other sections, special expensive mechanisms must be used such as a separate motor to drive the curved segment or clutches to selectively transfer power from the straight segment to the curved segment.

Figure 1:
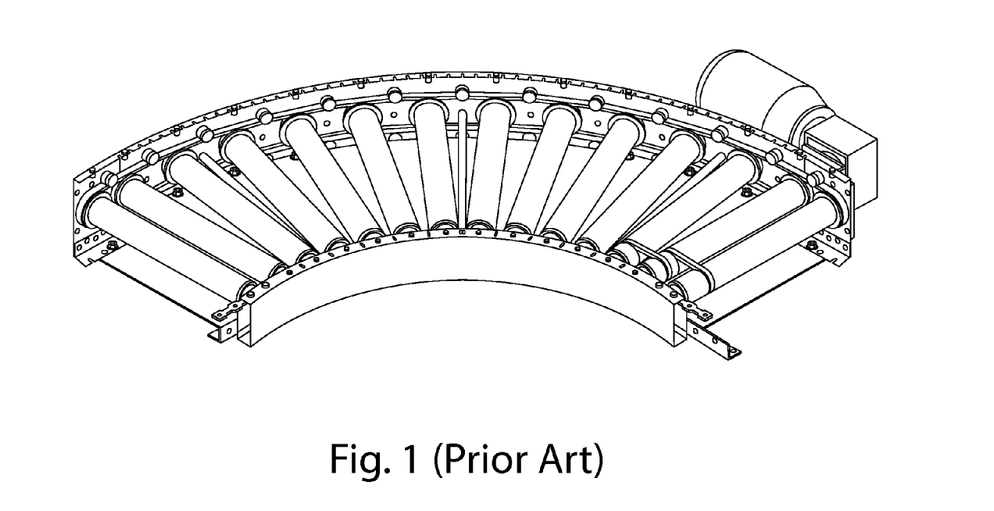
FIG. 1 is a perspective view of a curved roller bed having a motor drive in a continuous V-belt.

One such prior art curved segment is illustrated in FIG. 1 and has its own independent motor and an elongated continuous V-belt with various drive pulleys on each roller and additional tension rollers attached to the frame. The first downside to the system illustrated in FIG. 1 is that it requires an independent motor, which is expensive and increases the product cost. Installation costs are also increased as power must be run to each motor location. Conveyor systems requiring a separate motor and therefore separate electric power connections are more difficult to reconfigure due to the requirement for moving the electric motor and associated power connections. In addition, the elongated continuous V-belts are typically expensive as changes in radius, length, and degree of curve all change the length of the required belt which may in turn require the system to use numerous custom sized belts. Another problem is that the curve of the conveyor segment may create additional wear on the continuous V-belt by each pulley, as each pulley has an axis that is not aligned with adjacent pulleys. Another downside to using a continuous V-belt on a curved section is that if a roller or rollers stop turning, it may cause the V-belt to also stop, while the motor and associated drive pulley continue spinning, creating localized wear and heat, which significantly shortens the life of the V-belt.

Figure 2:
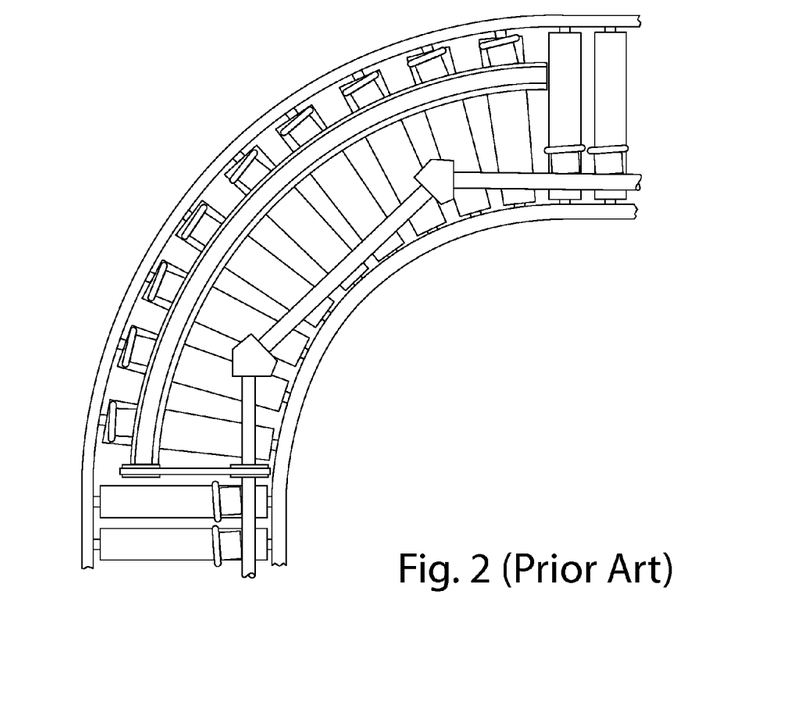
FIG. 2 is a bottom view of a roller bed having a shaft, drive rollers, load rollers and multiple belts.

In regards to FIG. 2, some manufactures, to avoid issues with separate motors for curved segments have proposed drive shafts with universal joints and individual drive rollers frictionally engaging at least some of the load bearing rollers, all of which significantly increase product cost and are difficult to and expensive to maintain. In some instances, a complicated system having a transfer belt and short curved drive belt segments are used. The curved drive belt must typically be customized to the application and specific design requirements and changes in the radius or length require different belts, a change in the number of required belts or a change in underlying belt supports. These customized belts may cause difficulty for the operators of the conveyor system in ordering the proper belt in the correct radius and length as well are difficult to install properly so they track as desired. The drive shafts, universal joints, customized belts, and secondary friction drive rollers all create a very expensive drive system as well as increased installation costs.

Figure 3:
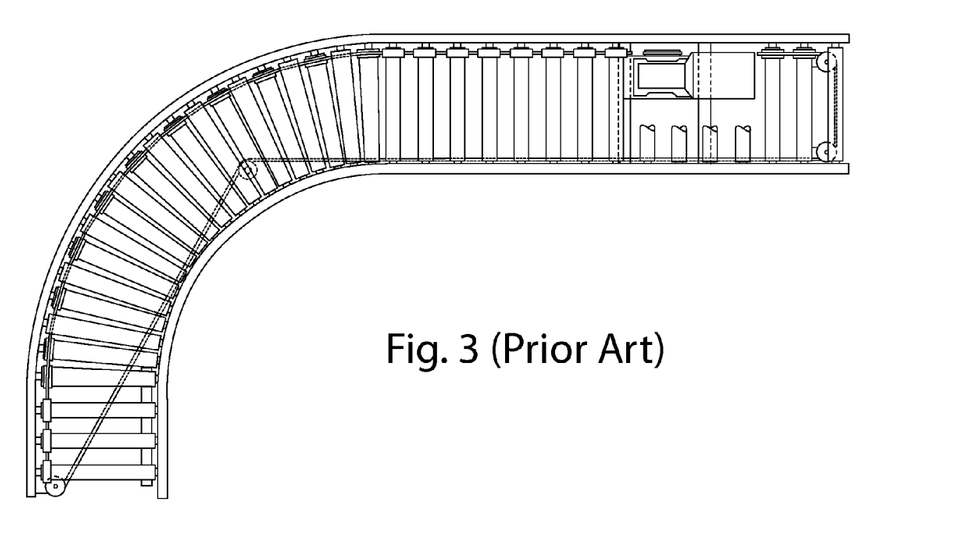
FIG. 3 is a top view showing a straight segment, a curved segment and a drive system including a motor and an extremely long V-belt with associated pulleys for a roller conveyor.
Figure 4:
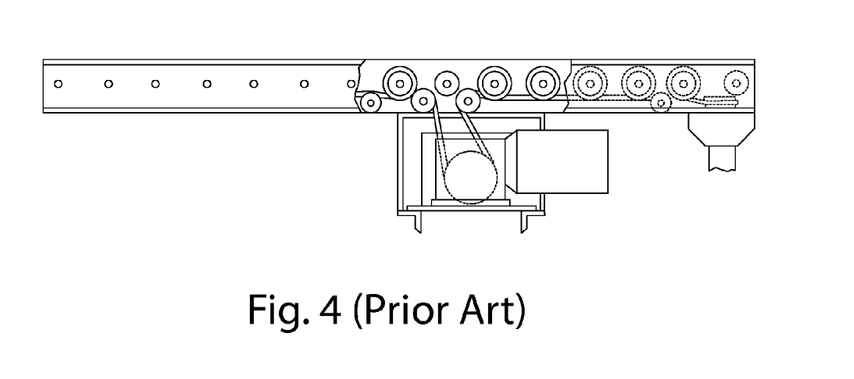
FIG. 4 is a partial sectional view of the conveyor system in FIG. 3 showing the routing path of the V-belt.

Other manufacturers, as illustrated in FIGS. 3 and 4 in the curved segments, may use an extremely long V-belt to transfer power from a straight segment or a motor driving the straight segment. Although not illustrated, some systems use a V-belt similar to that illustrated in FIG. 3 with a transfer pulley and clutch allowing drive to be transferred from the straight segment without the use of the illustrated motor. The long V-belts may experience many of the problems listed above.

All of the above illustrated systems include drawbacks that reduce the reliability, longevity, or increase the cost of the drive system for the curved conveyor segments as well as installation and later reconfiguration costs. Furthermore, the above described systems may include specialized belt lengths that may be difficult to easily order in a standardized size or may be extremely difficult to repair. For example, if the elongated V-belt in FIG. 3 breaks, it is difficult to quickly and efficiently repair the system.

SUMMARY OF THE INVENTION

The present invention relates to a drive system for curved segments of roller conveyors and more specifically to a cost-effective, efficient, and reliable system of transferring power from a straight segment to an adjacent curved segment. In particular, when used in conjunction with an accumulating conveyor, the present invention provides a very cost-effective, reliable and efficient conveyor system when compared to the existing art and easily and efficiently transfers the ability to turn the rollers from a driven straight segment to a slave curved segment.

The system of the present invention uses micro-V-groove belts to transfer drive between adjacent rollers, such that only one micro-V-groove belt is used between two adjacent rollers. The micro-V-groove belts allows transfer from a straight section using a single micro-V-groove belt to an adjacent curved section solely by tying the end roller of each of the curved section and straight section together with a single micro-V-groove belt.

The present invention is directed to a conveyor system including a driven straight segment and a slave curved segment. Each of the driven straight segment and slave curved segment includes a plurality of rollers extending between two adjacent frames and a plurality of slave rollers on the slave curved segment include a pulley on one end proximate to one of the two adjacent frames and at least one driven roller on the driven segment includes a pulley on one end proximate to one of the two adjacent frames. A plurality of micro-V-groove belts provide drive to curved or slave segments that were previously difficult and expensive to operational drive and use as an accumulator conveyor. Each micro-V-groove belt has a drive surface including at least two ridges and at least one groove. At least one of the micro-V-groove belt extends between the at least one roller on the driven straight segment to one of the plurality of rollers on the slave curved segment.

As it is expected that each micro-V-groove belt will only be coupled directly to two rollers, specifically two adjacent rollers, to transfer drive in a daisy chain fashion down the adjacent rollers, the majority of the plurality of slave rollers on the slave segment are each operationally coupled to at least two of the plurality of micro-V-groove belts. If the drive transfer portion includes more than two rollers, than the majority of the roller in the drive transfer portion must be coupled to two micro-V-groove belts. Furthermore, if the driven straight segment includes a drive transfer portion including the at least one driven roller, wherein the majority of the at least one driven roller in the drive transfer portion are operationally coupled to at least one of the plurality of micro-V-groove belts.

The driven straight segment includes a plurality of rollers outside of the drive transfer portion and the plurality of rollers outside of the drive transfer portion are not coupled to the plurality of micro-V-groove belts, and are only operationally coupled at most through the main drive belt engaging each of the rollers.

The drive system has a main drive belt and the rollers outside of the drive transfer portion and the at least one driven roller in the drive transfer portion collectively define a load surface and an opposing driven surface and wherein the main drive belt engages the rollers outside of the drive transfer portion and the at least one driven roller in the drive transfer portion on the driven surface.

The micro-V-groove belt on the drive surface has an operational profile width that is at least fifty percent greater than the overall width of the micro-V-groove belt, and the majority of the at least one driven roller are each coupled or operationally coupled to at least two of the plurality of micro-V-groove belts. The conveyor system includes a second pulley on each roller, located on either the same side as the first pulley, or on an opposing end from the pulley on the one end. If pulleys are on each end, every other pair of adjacent rollers is operationally coupled with a micro-V-groove belt on each end of the roller, and a first end of the roller is coupled to a different adjacent roller than a second opposing end of the roller.

The present invention is directed to a conveyor system including a driven straight segment having a drive transfer portion including at least one driven roller and at least one driven roller includes a driving pulley. A slave curved segment having an outer frame and an inner frame, each having an arcuate profile are adjacent to the driven straight section. The radius of the outer frame arcuate profile is greater than the radius of the inner frame profile. A plurality of slave rollers extending between the inner frame and outer frame on the slave curved segment, and each of the slave rollers includes an operational axis transverse to the outer and inner frames about which the plurality of slave rollers each rotate. The majority of the slave rollers include a slave pulley and a micro-V-groove transfer belt extends between the driven pulley and an adjacent slave pulley, at least for a driven roller that is proximate to said slave segment. The micro-V-groove belt includes a drive surface having at least two ridges and at least one groove and the slave and the driven pulleys each include a substantially mirror image of the drive surface. The present invention uses a plurality of micro-V-groove slave belts extending between a majority of the slave rollers and wherein the majority of slave rollers are coupled to at least two micro-V-groove slave belts. The majority of slave rollers are coupled to at least two adjacent slave rollers. The majority of slave rollers include all the rollers on the slave curved segment except a first slave roller located adjacent to the drive straight segment and an opposing last slave roller. The first slave roller would be operationally coupled to a driven roller, and the last slave roller only needs to be coupled to a single micro-V-groove belt, because there are no further rollers in the chain that need to be driven. While all of the micro-V-groove slave belts may be located on the inner portion of the curve, they may also alternate between an inner end and an outer end of the slave rollers.

A slave pulley is included on each end of the slave rollers creating an inner slave pulley and an outer slave pulley and wherein each of the slave rollers other than a first slave roller and a last slave roller are coupled at an inner end to a inner micro-V-groove slave belt and at an outer end to an outer micro-V-groove slave belt, which in combination form the at least two micro-V-groove slave belts.

The present invention is further directed to a conveyor system including a drive system having a main drive belt. The main drive belt engages a driven segment having a drive transfer portion including a plurality of driven rollers and wherein each of the driven rollers. The driven rollers include a driving pulley at a first end and the main drive belt is configured to selectively engage the plurality of driven rollers in the drive transfer portion and wherein the driven rollers include a driven transfer roller located at the end of the driven segment and the end of the drive transfer portion. A slave segment having an outer frame and an inner frame, each having an arcuate profile and wherein the radius of the outer frame arcuate profile is greater than the radius of the inner frame profile, and wherein the slave segment does not operationally engage the main drive belt.

A plurality of slave rollers extend between the inner frame and outer frame on the slave segment, and each of the slave rollers includes an operational axis transverse to the outer and inner frames about which the plurality of slave rollers each rotate. It is expected that a majority, if not all of the slave rollers include a slave pulley. The plurality of slave rollers will include a slave transfer roller located adjacent to the drive transfer portion and which is operationally coupled to at least one driven roller, and more specifically directly coupled to a driven roller. At least one micro-V-groove drive belt from the plurality of micro-V-groove drive belts extends between each adjacent driven roller in the drive transfer portion. At least one micro-V-slave belt from a plurality of micro-V-groove slave belts extends between each adjacent slave roller in the slave segment. A micro-V-groove transfer belt extends between the driven transfer roller and the slave transfer roller. The micro-V-groove slave belts and each of the micro-V-groove drive belts are each directly coupled to no more than two rollers. In addition, the majority of the drive rollers are coupled to at least two micro-V-groove drive belts, and the majority of the slave rollers are coupled to at least two micro-V-groove slave belts. The micro-V-groove belt includes a drive surface having at least two ridges and at least one groove and the slave and the driven pulleys each include a substantially mirror image of the drive surface.

DETAILED DESCRIPTION OF THE PREFERRED EMBODIMENT

The present invention is generally directed to a conveyor system 10 and more specifically to a roller bed conveyor system, and yet more specifically to a drive system 20 for an accumulator conveyor system 10. The conveyor system 10 generally includes a structural support assembly 12 including supporting legs (not shown) and elongated frames 20 running in the direction of travel of the loads. The frames 20 are located on each side and support and properly space the individual rollers 30 that form the roller bed and rotate about an operational axis 29. As illustrated in the Figures, the frames 20 may be straight in certain segments as well as curved in others.

In the present invention, the conveyor system 10, structural support assembly 12 and associated frames 20 may be made in any size, shape, and configuration such as having various lengths and radii to transport loads along the desired paths and to the desired locations. The conveyor system 10 is specifically configured to transfer power from the drive system 40 of the driven straight conveyor segments 14 to slave segments, such as the illustrated slave curved conveyor segments 16. The present invention allows roller bed conveyor systems 10 to drive curved segments 16 without using expensive motors, or clutches, V-belt systems which are difficult to replace and route, or drive shafts and friction rollers. The rollers 30 are typically any type of roller used on a roller conveyor system 10, however at times the rollers 30 in the drive transfer portion 50 that are operationally coupled to micro-V-groove belts 60 may also be referred as drive rollers 26 and in the curved conveyor segment 16 the rollers 30 that are in the slave curved segment 16 and are operationally coupled to micro-V-groove belts 60 may be referred to as slave rollers 28. While the rollers 30 may be any acceptable type of roller, the rollers 30 in the curved segment 16 may also have an increase diameter near the outer edge to minimize gaps between the rollers 30 in the curved segments 16. While rollers 30 in both the drive transfer portion 50 and slave segment 16 may include a pulley 32, for ease of description but in no way should be considered limiting, the pulley 32 on the drive rollers 26 may be referred to as a drive pulley 31 and on the slave roller 28 a slave pulley 33. The micro-V-groove belts 60 in the drive transfer portion 50 may be referred to as drive belts 54, the micro-V-groove belt 60 that extends between the drive transfer portion 50 and the slave segment 16 may be referred to as a transfer belt 56, and the micro-V-groove belts 60 that extend between rollers 30 in the slave segment 16 may be referred to as slave belts 58.

Figure 5:
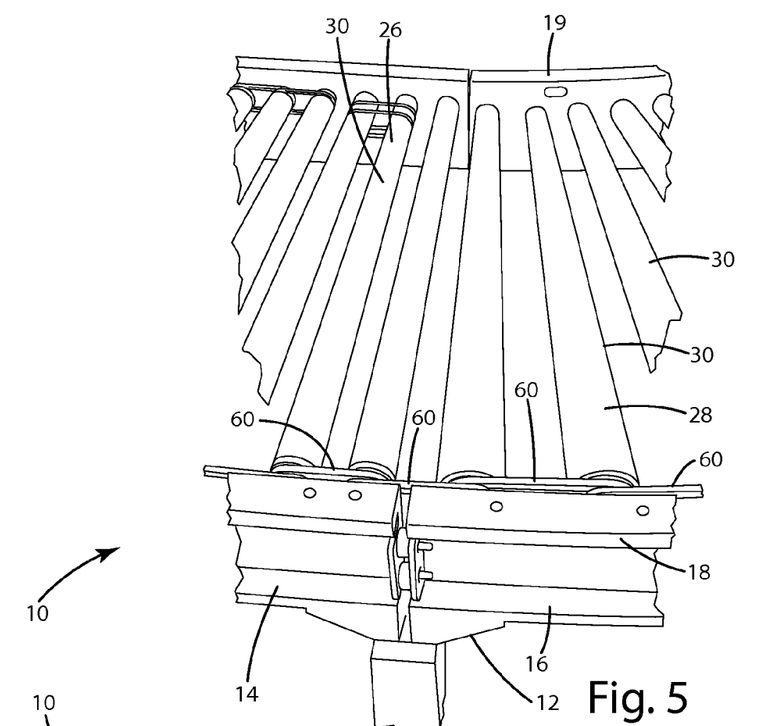
FIG. 5 is a perspective view of a conveyor system including the present invention and having a straight segment, a curved segment and multiple micro-V-groove belts for transferring power from the straight segment to the curved segment.
Figure 10:
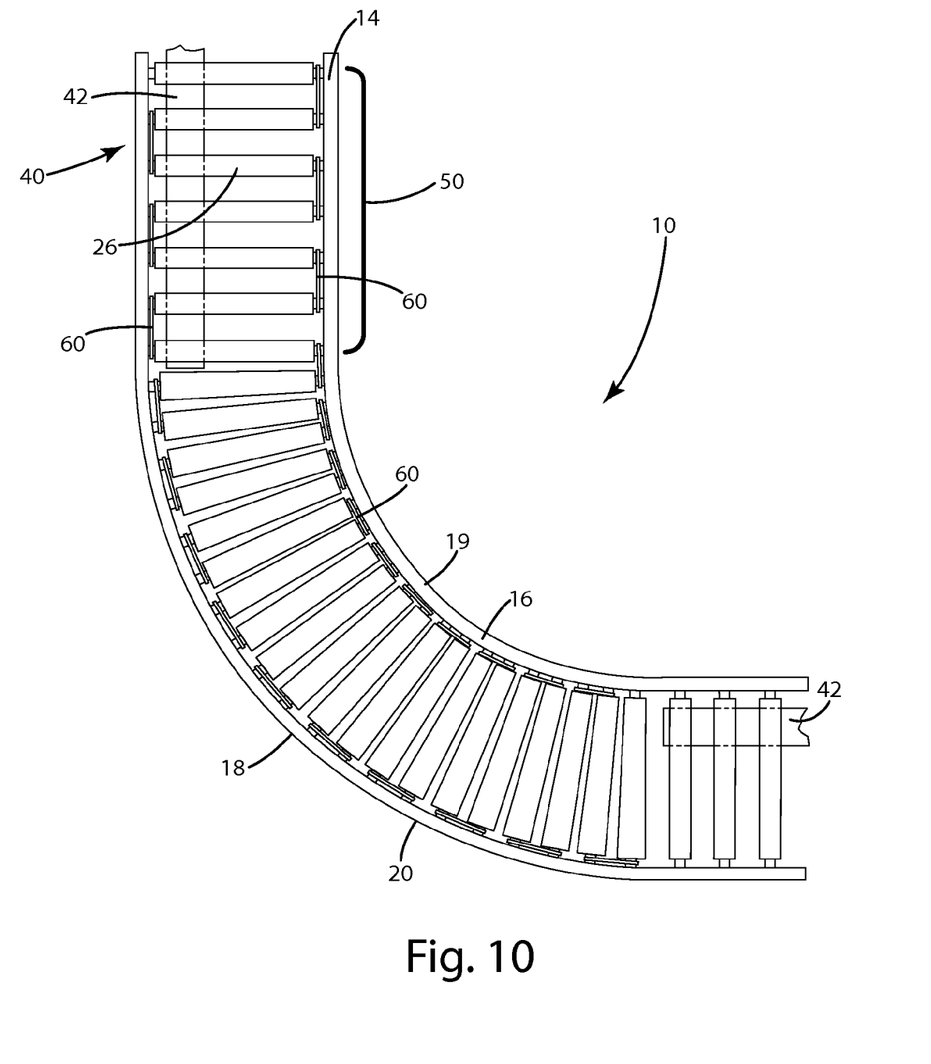
FIG. 10 illustrates a top view of an exemplary conveyor system including the present invention.

The conveyor system 10 is configured to allow easy, quick, and efficient repair of the drive system 40, including the micro-V-groove belts 60 with substantially less time when compared to other drive systems. In fact, the conveyor system 10 is configured to allow repair and maintenance of the illustrated micro-V-groove belts 60 in FIGS. 5 and 6 by simply removing two to four rollers to replace a single belt, and in an alternating configuration as illustrated in FIG. 10 only the two rollers 30 that should be operationally coupled with the micro-V-belt 60 that is being replaced. The rollers 30 of the present invention may be configured like traditional rollers in that they may be spring-loaded into the frames 20 to facilitate easy removal and installation.

As illustrated in FIGS. 5, 6 9, and 10, a main drive belt 42 is used to drive the individual rollers 30 on the driven straight segment 14 of the conveyor system 10. Of course, any other type of drive system may be used so long as the conveyor system 10 is capable of transferring power using the micro-V-groove belts 60 from at least one roller 30 on the drive transfer portion 50 on the end of the driven straight segment 14, or more specifically a driven roller 26.

Figure 9:
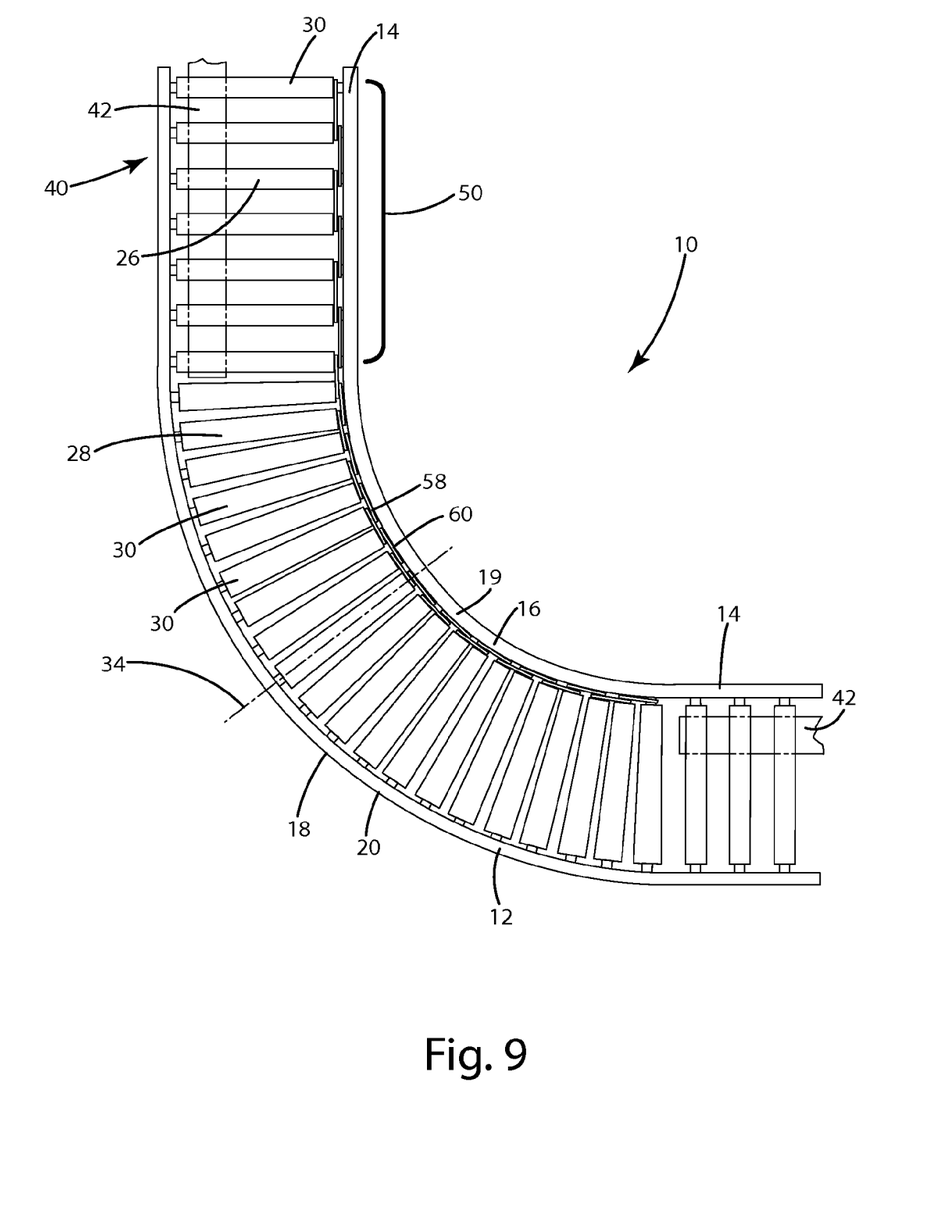
FIG. 9 illustrates a top view of an exemplary conveyor system including the present invention.

The present invention works well with accumulator conveyors 10 which can be configured to pneumatically raise or lower the elongated main drive belt 42 or sections thereof so that the main drive belt 42 engages or disengages the rollers 30, or portions of rollers. As illustrated in FIGS. 9 and 10, by engaging and disengaging only the drive transfer portion 50 of the driven straight segment 14, the operationally coupled slave curved segment 16, using the micro-V-groove belts 60, may be engaged and disengaged such that the curved section 16 may function as an accumulator conveyor 10 in conjunction with the drive transfer portion 50 of the straight segment 14, without the use of expensive motors and/or clutches solely dedicated to the curved portions. More specifically, the drive transfer portion 50 of the straight segment 14 is operationally coupled to the curved segment 16, such that when the rollers 30, specifically the driven rollers 26, on the drive transfer portion 50 are rotating, the rollers 30 in the curved segment 16, specifically the slave rollers 28, should also be rotating. Likewise, when the rollers 30 on the drive transfer portion 50, specifically the driven rollers 26 are stopped, the curved segment 16 rollers 30, specifically the slave rollers 28 also are stopped.

Figure 6:
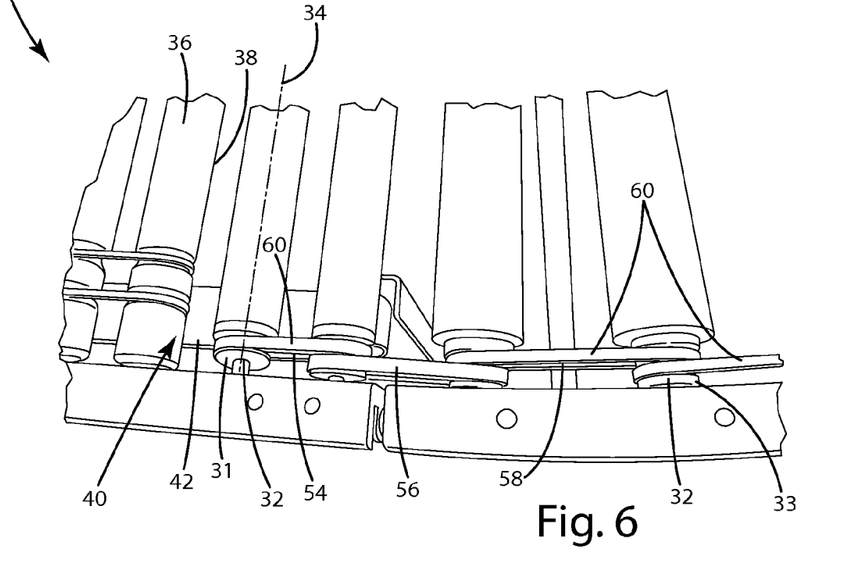
FIG. 6 is a partial top view of a conveyor system including the present invention and showing the intersection of the straight conveyor and curved conveyor segments with the micro-V-groove belt, associated pulleys and the main drive belt of the straight conveyor segment.

The conveyor system 10 through use of micro-V-groove belts 60 allows for transfer of rotational motion from roller 30 to roller 30 with minimal power loss. For example, the curved segment may use micro-V-groove belts 60 with a single micro-V-groove belt 60 passing between each adjacent pair of rollers 30 to power a complete 180° curve with as little as 5% rotational loss at the furthest roller 30 from the straight conveyor segment 14 used to drive the curved segment 16. In comparison, prior single V-belts as well as O-rings between rollers as illustrated in FIG. 6 have substantially greater losses. For example, a double O-ring drive system may power preferably only a few, typically no more than four, and at most less than acceptably only six adjacent rollers, with a substantial loss of RPM at the furthest away roller. The O-rings would be incapable of powering rollers four to six feet away from the straight conveyor segment, many times 8-30 rollers. While in the this application it is illustrated and discussed that each adjacent roller will be coupled with the micro-V-groove belts 60, it is possible that intervening rollers may exist in some circumstances, however to sufficiently power each roller, it is expected that each drive roller 26 and each slave roller 28 will be coupled to a micro-V-groove belt 60. A configuration where each roller 30 in the drive transfer portion 50 and slave segment 16 are operationally coupled together allows for maximum performance.

While the micro-V-groove belts 60 are exceptionally well-suited to transfer the rotational RPM with minimal losses between rollers 30 and are capable of transferring sufficient rotational power to a complete 180° turn in a roller bed segment 16 as well as long broad curves, the curved segment 16 may be split into two zones. For example, if a 180° curve segment is used, the in-feed straight segment 14 may power the first half of the 180° turn, while the out-feed straight segment 14' may power the latter half of the curved roller bed segment 16, as illustrated in FIG. 10. The only modification required to split the curved segment into two sections would be that one pair of adjacent rollers 30 in the curved section would not be connected with a micro-V-groove belt 60. Therefore, the present invention may provide the drive from the straight conveyor segments 14 on each side of the curved segments 16 such that the curved segments may operate in a split fashion, without any special motors, additional clutches or extended continuous V-belts, as accumulator conveyor systems.

The rollers 30 of the curved conveyor segment 16, or slave rollers 28 as well as the portion of the straight segment 14 adjacent to the curved segment, labeled in FIG. 9 as drive transfer portion 50 that transfers power from the main drive belt 42 to the curved segment 16, or drive rollers 26, are each fitted with pulleys 32 on at least one end of the roller 30, specifically slave pulleys 33. The pulleys 32 have a mirror image of the micro-V-groove belt 60 to maximize the contact surface between the micro-V-groove belt 60 and the pulley 32. While the pulleys 32 are illustrated as being on the outer edge 18 of the curved segment 16 in FIGS. 5 and 6 it is expected that they will be preferably on the inner edge 19 of the curved segment 16 as illustrated in FIG. 9. The size of the micro-V-groove belt 60 used between adjacent rollers may be standardized on the inner edge radius 18 of the curved segment 16. More specifically, as the amount of radius of the curved segment 16 increases or decreases, the spacing between the rotational axis 34 of the individual rollers 30 also increases or decreases on the outer edge and the diameter of the roller 30 at the outer edge 18 may also change, while the spacing at the inner edge 19 remains consistent. Therefore, if the individual micro-V-groove belts 60 are placed at the outer edge 18 of the curve 16, the micro-V-groove belts 60 may vary in size depending upon the application or vary between different curves. However, if the micro-V-groove belts 60 are placed at the inner edge 19 of the curved segment 16, the rollers 30 may be configured in a standardized configuration with standardized spacing, thus allowing for standardized sizing to the belts 60. The standardized spacing is useful in standardizing the sizing of the micro-V-groove belts 60 such that a single length of the micro-V-groove belt 60 may be used on a variety of different curvatures of the curved segments 16, thus reducing inventory costs and improving the ease of maintaining a system having curved segments of various radii.

The drive transfer portion 50 of the straight conveyor segment 14 also includes rollers 30, specifically driven rollers 26, having the specialized micro-V-groove pulleys 32 or driven pulleys 31, on at least one end. Because the efficiency of energy transfer and minimal power loss using the micro-V-groove belts 60, the rotational energy of a single pulley 32 on a driven roller 26 at the end of the straight segment 14 is sufficient to drive the whole curved segment 16. More specifically, only a single micro-V-groove belt is required to extend between the adjacent last roller on the straight segment 14 and the first roller on the curved segment 16. While multiple micro-V-groove belts may be used, it has been found that as configured in the present invention only a single belt 60 is needed. Therefore, the limiting factor, unlike o-rings and v-belts is not the transfer between each roller, but the efficiency of the main drive belt 42 against the driven rollers 26. As this efficiency is much less, it is preferable that multiple rollers on the adjacent straight segment 14, specifically the drive transfer portion 50, be tied together with micro-V-groove belts to prevent the main drive belt 42 from slipping against the driven rollers 26 in the drive transfer portion 50. More specifically, while slippage of the micro-V-groove belt 60 on the micro-V-groove pulley 32 is not a concern, if a main drive belt 42 is used, as illustrated in FIGS. 6 and 9, to provide rotational energy to the rollers, if only a single roller was used, it is likely that in driving the curved segment 16, the main drive belt would slip against the single roller 30 used to transfer rotational power to the rollers 30 of the curved segment 16. More specifically, the frictional engagement of a single micro groove V-belt against slipping is greater than the much larger main drive belt 42 against a single roller 30, and even against multiple rollers. As the rollers 30 are round, only a small area frictional engages the drive belt 42 so multiple rollers on the straight segment 14 are desired to be linked with micro groove V-belts 60 in the drive transfer portion 50 of the straight segment 14. Therefore, to ensure a large enough contact surface with enough rollers 30, multiple driven rollers 26 in the straight segment are tied together with the micro-V-groove belt drive system to minimize slippage of the main drive belt 42 against the driven rollers 26 in the straight segment 14 which are used to drive the curved segment 16. It is expected that the drive transfer portion 50 is two to six feet or four to twelve rollers at the end of the straight conveyor segment and each roller 30 will include pulleys 32 engaging the micro-V-groove belts 60 used to drive the curved conveyor segment 16. As the limiting factor is the slippage of the main drive belt 42 on the straight conveyor segment 14 against the rollers 30 that are coupled together with micro-V-groove belts 60, the number of rollers 30 needed to drive the curved segment 16, and therefore the number of rollers 30 in the drive transfer portion 50 may be easily determined. More specifically, the size of the drive transfer portion 50, specifically the included number of rollers 30, or driven rollers 26, may be calculated based on the length of the curved section 16, the weight of the loads individually as well as the expected combined weight of the loads on the curved section 16, as well as any loads that may be expected on the drive transfer portion 50. As stated above, the present invention may use just a single micro-V-groove belt 60 to transfer the power from the last roller 30 on the straight conveyor segment 14 to the first one on the curved segment with minimal loss in drive power, between that roller and the curved segment 16. As such, the number of rollers 30 being tied together on the straight conveyor segment 14 with a micro-V-groove belt 60 to form the drive transfer portion 50 is calculated only on the efficiency of the energy transfer between the main drive belt 42 and the individual rollers 30 on the straight section 14, or the main efficiency of the drive system 40 on the straight segment 14 relative to the rollers 30. Of course, the more efficiently the rollers 30 on the drive transfer portion 50 are driven, the smaller the required size of the drive transfer portion. For example, if a single roller was directly connected to an electric motor, so that the energy transfer was completely efficient and only limited by the size of the motor, that single roller could form the drive transfer portion 50 and only a single micro-V-groove belt could transfer power to the 16 curved segment, with only a single micro-V-groove belt extending between each pair of adjacent rollers, with the understanding that every roller other than the single driven roller 26 and furthest away roller on the curved section is coupled to two micro-V-groove belts, the complete curved segment could be driven from a single roller. While the present invention discusses transferring power from straight section drive transfer portion, of course the first roller on the curved segment 16 may be driven and then in turn drive the remaining rollers 30 in the curved segment 16. As such, the driven roller 26 may in limited circumstances be on the curved segment 16, with the remaining rollers 30 being slave rollers 28 operationally coupled with the micro-V-groove belts. In addition, while the drive transfer portion 50 is discussed and illustrated as being on the end of a straight segment 14, it is possible for the main drive belt 42 to extend beyond the straight segment, causing the drive transfer portion to include a portion of the rollers on the straight segment and a portion on the curved segment or even only the first few rollers on the curved segment. As most curves are gradual, a main drive belt extending near the inner frame could extend into the curved segment and frictionally engage rollers on the curved segment.

While the present invention describes using a micro-V-groove belt 60 on only one end of the rollers 30, it could be configured to include a micro-V-groove belt 60 on each end of the individual rollers 30. Currently for all curved sections 16, this is not needed, but to drive even longer sections of roller conveyors, including straight segments, the micro-V-groove belts may be coupled to each end of the individual rollers, such that two directly adjacent rollers are tied together with two micro-V-groove belts. Of course, this would require a total of four belts 60 coupled to any individual roller 30, other than the end rollers. This type of drive may be useful in low cost reconfigurations, such as to transfer power to a longer section, including even a straight section using existing drive systems, without the need to reroute power supplies or install additional main drive belts. More specifically, the present invention may allow driving of various straight sections without substantial reconfiguration costs. More specifically, the present invention may be used in situations where it is desirable to extend a straight segment of the conveyor by a couple of feet and where it isn't cost effective to just extend of add an additional main drive belt. Therefore, it may be desirable to extend the length of a conveyor to address certain performance characteristics. The present invention allows users of such conveyor systems avoid the expensive reconfiguration cost due to the required additional drive system. The present invention allows such an extension very cheaply by adding an extended segment having the rollers operationally coupled together with micro-V-groove belts and replacing rollers on the end of the last driven straight segment to create a drive transfer portion 50 on the straight segment 14. As such, an extension of a conveyor system does not require under the present invention new expensive drive systems but only the additional supporting structure 12, rollers 30 as well as replacement of a few rollers on the last straight segment 14 to create a drive transfer portion 50. Therefore, the present invention allows reconfiguration and the addition of straight segments as well as driving of curved segments for only a fraction of the cost on installed systems.

In addition, to improve the ease of assembly and disassembly or replacement of broken or worn micro-V-groove belts 60, the present invention may be configured such that the micro-V-groove belts 60 alternate between the outer and inner segments 18, 19 of the curves 16. Due to the tension on the micro-V-groove belt 60 and individual rollers 30, the replacement of the individual micro-V-groove belts 60 may be eased in that two adjacent rollers 30 at either the inner or outer edge are tied together but are not tied to the next adjacent rollers 30. This step configuration between the inner and outer improves the speed of installation or replacement of micro-V-groove belts 60.

Figure 7:
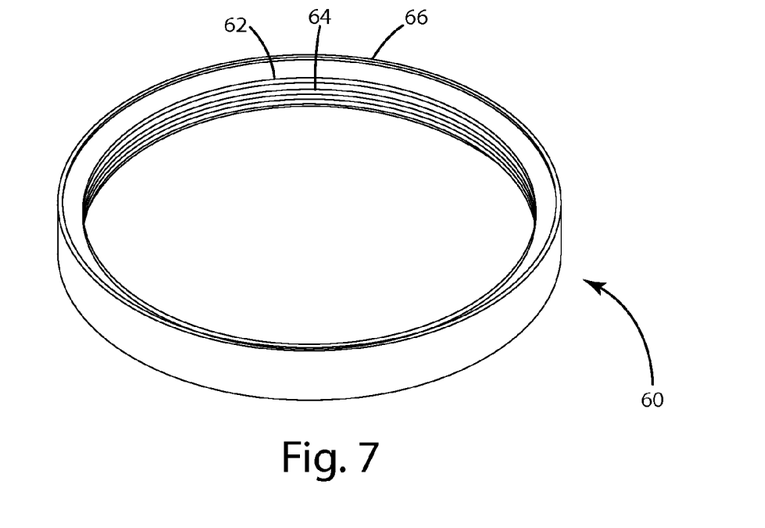
FIG. 7 shows a first perspective view of an exemplary micro-V-groove belt.
Figure 8:
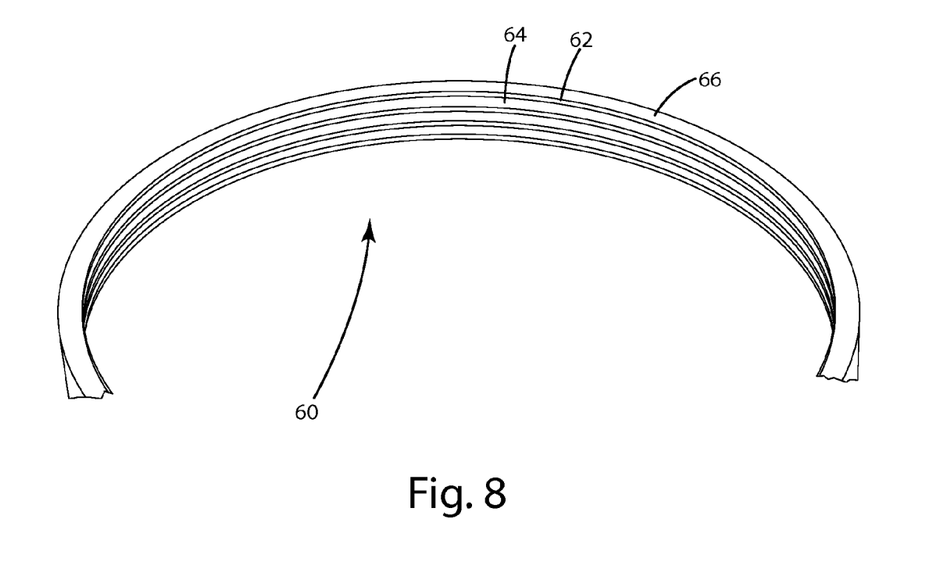
FIG. 8 illustrates a second perspective view of an exemplary micro-V-groove belt.

As illustrated in FIGS. 7 and 8, the micro-V-groove belt 60 is shown having four ridges 62 and three grooves 64 but is likely that the pulley 32 will engage the outer edge 66 also causing the associated pulley 32 to have five ridges 62 and four grooves 64 for each micro-V-belt 60. Of course, the number of ridges and grooves may be greater and if the micro-V-groove belts on adjacent rollers are placed proximate to each other on either the inner or outer edges, the pulley 32 could have many more grooves and ridges to accommodate the close proximity of the individual micro-V-groove belts 60. The micro-V-groove belts are configured to have a surface contact or profile width, measured along a line perpendicular to its length that is substantially greater than its width. More specifically the contact along a line, perpendicular to the length, with the pulley in total is expected to be greater than the belt's width, preferably, at least 50% greater. Also, the width is expected to be at least double and even up to greater than three times the thickness of the belt. Of course, the number of ridges and grooves may vary, but at least a plurality of ridges or grooves is required.

The invention claimed is:

1. A conveyor system comprising:
 a driven straight segment and a slave curved segment and wherein each of said driven straight segment and slave curved segment includes a plurality of rollers extending between two adjacent frames and wherein a plurality of slave rollers on said slave curved segment include a pulley on one end proximate to one of said two adjacent frames and at least one driven roller on said driven segment includes a pulley on one end proximate to one of said two adjacent frames; and
 a plurality of micro-V-groove belts each having a drive surface including at least two ridges and at least one groove and wherein one of said micro-V-groove belt extends between said at least one roller on said driven straight segment to one of said plurality of rollers on said slave curved segment.

2. The conveyor system of claim 1 wherein the majority of said plurality of slave rollers on said slave segment are each coupled to at least two of said plurality of micro-V-groove belts.

3. The conveyor system of claim 1 wherein said driven straight segment includes a drive transfer portion including said at least one driven roller and wherein the majority of said at least one driven roller in said drive transfer portion are coupled to at least one of said plurality of micro-V-groove belts.

4. The conveyor system of claim 3 wherein said driven straight segment includes a plurality of rollers outside of the drive transfer portion and wherein said plurality of rollers outside of the drive transfer portion are not operationally coupled to said plurality of micro-V-groove belts.

5. The conveyor system of claim 4 further including a drive system having a main drive belt and wherein said rollers outside of the drive transfer portion and said at least one driven roller in the drive transfer portion collectively define a load surface and an opposing driven surface and wherein said main drive belt engages said rollers outside of said drive transfer portion and said at least one driven roller in said drive transfer portion on said driven surface.

6. The conveyor system of claim 1 wherein said micro-V-groove belt on said drive surface has an operational profile width that is at least fifty percent greater than the overall width of said micro-V-groove belt.

7. The conveyor system of claim 1 wherein the majority of said at least one driven roller are each operationally coupled to at least two of said plurality of micro-V-groove belts.

8. The conveyor system of claim 1 further including a second pulley on each roller.

9. The conveyor system of claim 8 wherein said second pulley is located on an opposing end from said pulley on said one end.

10. The conveyor system of claim 9 wherein every other pair of adjacent rollers is operationally coupled with a micro-V-groove belt on each end of the roller, and wherein a first end of the roller is coupled to a different adjacent roller than a second opposing end of said roller.

11. A conveyor system comprising:
 a driven straight segment having a drive transfer portion including at least one driven roller and wherein said at least one driven roller includes a driving pulley;
 a slave curved segment having an outer frame and an inner frame, each having an arcuate profile and wherein the radius of said outer frame arcuate profile is greater than the radius of said inner frame profile;
 a plurality of slave rollers extending between said inner frame and outer frame on said slave curved segment, and wherein each of said slave rollers includes an operational axis transverse to said outer and inner frames about which said plurality of slave rollers each rotate, and wherein a majority of said slave rollers include a slave pulley;
 a micro-V-groove transfer belt extending between said driven pulley and an adjacent slave pulley and wherein said micro-V-groove belt includes a drive surface having at least two ridges and at least one groove and said slave and said driven pulleys each include a substantially mirror image of said drive surface; and
 a plurality of micro-V-groove slave belts extending between a majority of said slave rollers and wherein said majority of slave rollers are coupled to at least two micro-V-groove slave belts.

12. The system of claim 11 wherein each of said majority of slave rollers is coupled to at least two adjacent slave rollers.

13. The system of claim 12 wherein said majority of slave rollers includes all the rollers on the slave curved segment except a first slave roller located adjacent to said drive straight segment and an opposing last slave roller.

14. The system of claim 11 wherein said plurality of micro-V-groove slave belts alternate between an inner end and an outer end of said slave rollers.

15. The system of claim 14 wherein slave pulley is included on each end of said slave rollers creating an inner slave pulley and an outer slave pulley and wherein each of said slave rollers other than a first slave roller and a last slave roller are coupled at an inner end to a inner micro-V-groove slave belt and at an outer end to an outer micro-V-groove slave belt, which in combination form said at least two micro-V-groove slave belts.

16. A conveyor system comprising:
 a drive system including a main drive belt;

a driven segment having a drive transfer portion including a plurality of driven rollers and wherein each of said driven rollers includes a driving pulley at a first end, and wherein said main drive belt is configured to selectively engage said plurality of driven rollers in said drive transfer portion and wherein said driven rollers include a driven transfer roller located at the end of said driven segment and the end of said drive transfer portion;

a slave segment having an outer frame and an inner frame, each having an arcuate profile and wherein the radius of said outer frame arcuate profile is greater than the radius of said inner frame profile, and wherein said slave segment does not operationally engage said main drive belt;

a plurality of slave rollers extending between said inner frame and outer frame on said slave segment, and wherein each of said slave rollers includes an operational axis transverse to said outer and inner frames about which said plurality of slave rollers each rotate, and wherein a majority of said slave rollers include a slave pulley, and wherein said plurality of slave rollers include a slave transfer roller located adjacent to said drive transfer portion;

a plurality of micro-V-groove drive belts and wherein at least one micro-V-groove drive belt from said plurality of micro-V-groove drive belts extends between each adjacent driven roller in said drive transfer portion;

a plurality of micro-V-groove slave belts and wherein at least one micro-V-slave belt from said plurality of micro-V-groove slave belts extends between each adjacent slave roller in said slave segment; and a micro-V-groove transfer belt extending between said driven transfer roller and said slave transfer roller.

17. The conveyor system of claim 16 wherein each of said plurality of micro-V-groove slave belts and each of said micro-V-groove drive belts are directly coupled to no more than two rollers.

18. The conveyor system of claim 17 wherein the majority of said drive rollers are coupled to at least two micro-V-groove drive belts, and the majority of said slave rollers are coupled to at least two micro-V-groove slave belts.

19. The conveyor system of claim 16 wherein said micro-V-groove belt includes a drive surface having at least two ridges and at least one groove and said slave and said driven pulleys each include a substantially mirror image of said drive surface.

* * * * *